(12) United States Patent
Franklin

(10) Patent No.: US 6,532,829 B1
(45) Date of Patent: Mar. 18, 2003

(54) FLUID FLOW MEASUREMENT

(75) Inventor: Bryan Franklin, Huntingdon (GB)

(73) Assignee: ABB Instrumentation Limited, LTD, Stonehouse (GB)

( * ) Notice: Subject to any disclaimer, the term of this patent is extended or adjusted under 35 U.S.C. 154(b) by 0 days.

(21) Appl. No.: 09/486,554

(22) PCT Filed: Sep. 1, 1998

(86) PCT No.: PCT/GB98/02614
§ 371 (c)(1),
(2), (4) Date: Jul. 20, 2000

(87) PCT Pub. No.: WO99/12006
PCT Pub. Date: Mar. 11, 1999

(30) Foreign Application Priority Data

Sep. 1, 1997 (GB) .................... 9718519

(51) Int. Cl.⁷ .................... G01F 1/46
(52) U.S. Cl. .................... 73/861.66
(58) Field of Search .................... 73/861.66, 861.14, 73/861.12, 861.13, 194

(56) References Cited

U.S. PATENT DOCUMENTS 4,028,938 A * 6/1977 Eck .................... 73/194
4,688,432 A * 8/1987 Marsh .................... 73/861.15

FOREIGN PATENT DOCUMENTS

WO WO 91/07642 10/1990
WO WO 93/13425 12/1992

* cited by examiner

Primary Examiner—Benjamin R. Fuller
Assistant Examiner—Jewel V. Thompson
(74) Attorney, Agent, or Firm—Larson & Taylor, PLC

(57) ABSTRACT

A method and apparatus are provided for determining an estimate of flow stability, in addition to providing a measurement of flow velocity distribution. To this end, monitoring is provided of the changes over time of flow measurements from a plurality of spaced apart measuring points. An indication of the reliability of the flow velocity distribution measurement is produced based on the estimate of stability.

26 Claims, 1 Drawing Sheet

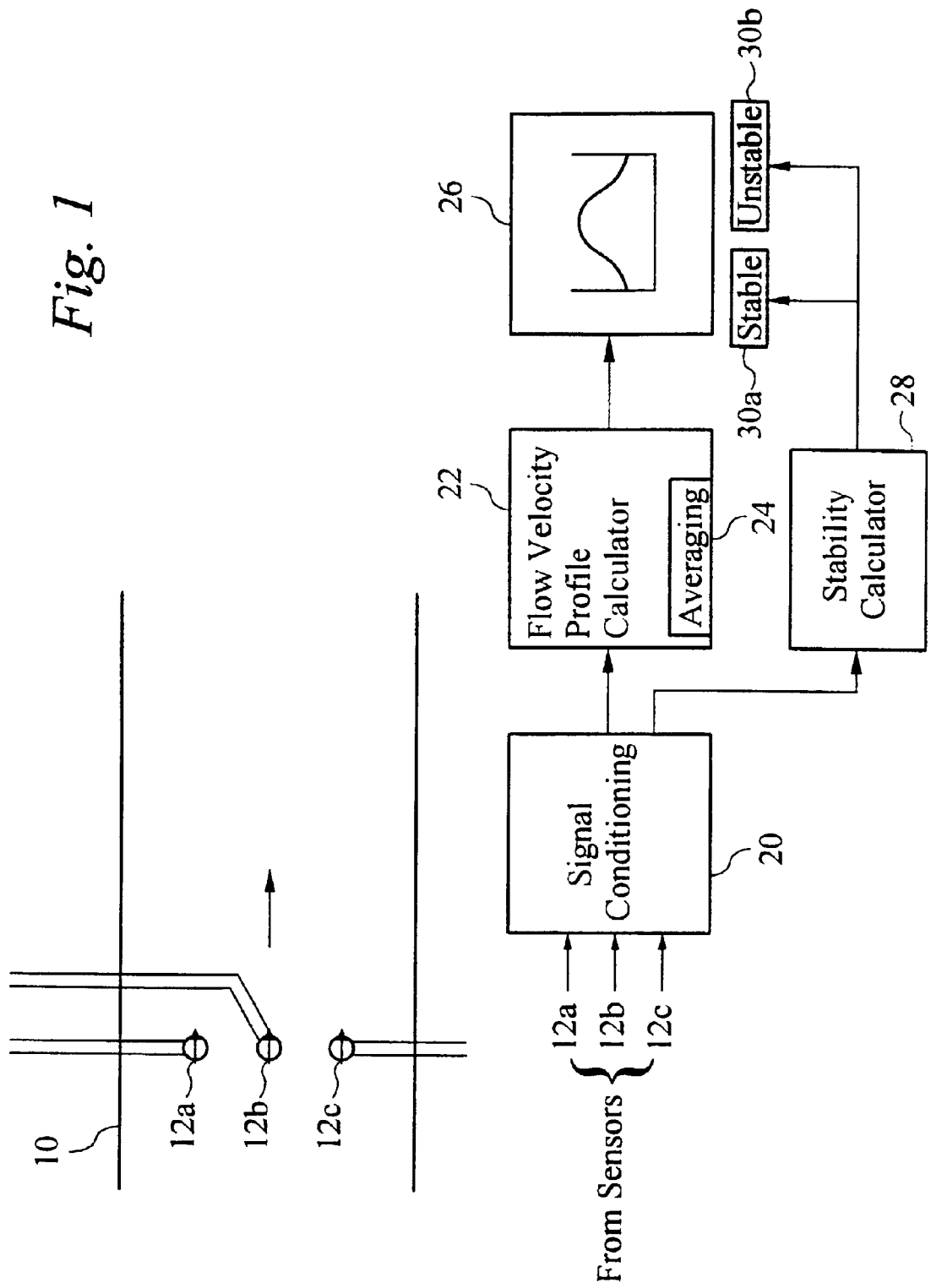

FLUID FLOW MEASUREMENT

FIELD OF THE INVENTION

This invention relates to fluid flow measurement and it relates especially, though not exclusively, to the measurement of liquid flow in pipes by means of so-called point-measuring devices.

DESCRIPTION OF THE RELATED ART

The preferred technique for measuring the flow of fluids through pipes utilises a full-bore flowmeter, such as an electromagnetic flowmeter, to take direct readings of the desired parameters. Frequently, however, practical constraints associated with various pipework installations militate against the use of such flowmeters for in-situ measurements.

In these circumstances, it is usual to employ a so-called point-measuring device which measures the flow velocity at a particular location within the pipe. In practice, the measurement relates to a small area of the cross-section of the pipe, rather than a point, and references herein to measurements made at or relating to points should be construed accordingly. In principle, measurements taken at one location can be used to calculate the volumetric flow of fluid through the pipe. This calculation, however, demands knowledge of a factor (known as the profile factor) which relates the measured (point) velocity to the mean velocity of fluid in the pipe as a whole. Whilst, in the case of a long straight pipe, the distribution of flow follows well established rules, rendering the profile factor readily predictable, most installed pipework layouts do not conform to this ideal, so the standard predictions cannot, in many cases, be used.

It thus becomes necessary to use the point-measuring device to take a number of readings over a cross section of the pipe, to establish the profile factor by measurement.

In practice, various factors can adversely influence the measurements and present methods based on this principle exhibit drawbacks in being unable to compensate adequately for the effects of such factors and/or to warn the user that some or all of the measurements may be flawed or contaminated to a degree that renders them unreliable.

GB-A-2045948 discloses a method and system for conducting multiple velocity measurements transfer of a flow stream cross section of known shape and area to determine flow therethrough.

U.S. Pat. No. 5,186,150 discloses flow rate measuring method and apparatus for determining a flow rate of a fluid through a pipe by using a fuzzy logic system.

It is an object of this invention to provide a method of measuring fluid flow in which the aforementioned drawback are at least reduced.

According to the invention there is provided a method of measuring fluid flow through a pipe including the steps of:
(a) obtaining a plurality of measurements indicative of the flow velocity a t each of a number of locations distributed over a cross-section of the pipe;
(b) deriving from at least a first subset of the measurements an evaluation of flow velocity distribution over the cross-section of the pipe;
(c) deriving from the change over time of at least a second subset of the measurements, an estimate of the stability of th e measured flow velocity, and
(d) providing an indication based upon said estimate of stability, of the reliability of said flow velocity distribution.

Step (b) of deriving an evaluation of flow velocity may comprise averaging some at least of the plurality of measurements.

In a closely related aspect, there is provided a method comprising:
(a) using a measuring device to take over a period of known duration a plurality of measurements indicative of the flow velocity at each of a number of locations distributed over a cross section of the pipe;
(b) averaging some at least of each plurality of measurements to provide averaged measurements;
(c) utilising the averaged measurements to derive an evaluation of the distribution of flow velocity over the cross-section of the pipe;
(d) deriving from at least some of said measurements of flow velocity an indication of the stability of the measured flow velocity; and
(e) providing an indication, based upon said indication of stability, of the reliability of said evaluation.

Preferably, said duration is between 20 and 120 seconds, and the measurements of flow velocity are taken in sequence at each of said locations by means of an electromagnetic insertion probe such as that known by our trade mark "AquaProbe". Such probes measure the flow velocity over a small area around their tip and are thus considered to be point-measuring devices.

The invention also extends to corresponding apparatus.

BRIEF DESCRIPTION OF THE DRAWING

In order that the invention may be clearly understood and readily carried into effect, an embodiment thereof will now be described, by way of example only, and without intending to limit the scope of the invention, with reference to the accompanying schematic drawing.

DESCRIPTION OF THE PREFERRED EMBODIMENTS

Referring to the schematic diagram of FIG. 1, apparatus in which the invention may be implemented will be briefly described. A pipe 10 through which flow is to be measured has a plurality of sensors 12a, 12b, 12c mounted to sense flow at different points across a cross section. In the example shown, there are 3 sensors, but there could be as few as two, or many more. Alternatively, one or more movable sensors may be employed to sense flow at more than one location. The sensors are substantially mounted in a plane through a cross section, but need not be exactly co-planar.

The outputs from the sensors are fed to signal conditioning circuitry 20, which supplies processed signals to a flow velocity profile calculator 22 including a time averaging unit 24. The flow velocity profile calculated is displayed graphically on a display 26. In addition, the measurements are fed to a stability calculator 28, arranged to operate as will be described below, which controls indicators 30a,30b providing an indication whether the flow is stable or not. The apparatus may formed from separate dedicated components, but is most preferably implemented by means of suitably programmed digital signal processing apparatus.

In this example, a probe of known construction is used to take measurements of the local flow velocity at each of a number of locations distributed over a cross-section of a pipe under examination.

The locations at which measurements are to be taken are calculated in advance, and it is preferable that the probe is moved amongst them in a predetermined sequence. Such sequences may, if desired or if it should prove necessary, include apparently random movements rather than progressive movements among neighbouring locations, in order to avoid risk of proximity-related cross-talk between measurements.

In accordance with this example of the invention, an assessment of the short-term stability of the measured velocity (sometimes called "noise") is carried out on the measurements at all locations. This assessment comprises, for each location, the steps of selecting the maximum and minimum measurements taken during the relevant period, subtracting the minimum measurement from the maximum measurement, dividing the result of the subtraction step by the mean of all the measurements taken at that location during the period, and multiplying the dividend by 100 to express the result as a percentage value. If that percentage value exceeds a predetermined maximum, in this example 10%, the measurements for that location are indicated to be unreliable due to excessive noise (or insufficient short-term stability). They may still be utilised, if desired, at the discretion of the operator, but a warning of unreliability, which can if desired be indelibly incorporated in the recordal process for the results, has been posted and the operator alerted to a potential problem.

It will be appreciated that the above-described procedure may be varied without departing from the scope of the invention. In particular, there is no need to conduct the multiplication by 100 if the threshold value is suitably scaled. These comments apply with equal force to the procedures to be described hereinafter and which relate to medium-term and long-term stability. Furthermore, in each case, the percentage value itself need not be used to compare against a threshold; a value derived therefrom by means of a known operation may be used instead, provided that due allowance for that operation is made when setting the threshold.

In a second assessment, the same measurements as above are additionally processed in accordance with a further series of steps to generate an indication of the stability of the flow velocity at each of the locations in the medium term, i.e. a period about as long as the said duration (typically 20 to 120 seconds). Such steps may comprise summing separately the first five and the last five measurements made at each location to generate initial sum and final sum values for each location, subtracting (for each location) the final sum from the initial sum, dividing the result by the initial sum and multiplying the dividend by 100 to express the result as a percentage value. If that percentage value exceeds a predetermined maximum which may or may not be the same as that applied in respect of the noise (short-term) evaluation described above, but which is in this example 10%, the measurements for that location are indicated to be unreliable for insufficient medium-term stability. Such an indication may be used as described above, and may be discounted at the discretion of the operator. However, an operator will clearly consider carefully proceeding with an evaluation based on measurements carrying warnings of both short- and medium-term instability.

In a still further assessment, certain of the above-described measurements together with some further sets of readings are used to evaluate the long-term stability of the measured velocity.

In this example, it is intended that "long-term" be construed to mean the period over which all of the measurements at all locations are collected, and the relevant evaluation comprises the steps of comparing measurements taken at the locations occupying the second, central and penultimate positions in the sequence of measurements with further readings taken with the probe re-sited at those same locations after the full sequence of measurements has been obtained. Any convenient correlation between corresponding measurements at the same location can be used, but it is preferred to utilise, for the original readings, values such as the sum of the first five measurements or the averaged values, for example, that already exist due to their having been used in earlier stages of evaluation. If this is done, then clearly corresponding values will be generated for the subsequently taken measurements so as to enable comparison to be made on a like-for-like basis. The mean of the comparisons for the three locations is converted into a percentage value by techniques such as those described above, and a percentage discrepancy exceeding a predetermined value such as 10% (but which may differ from either or both of the predetermined percentage values mentioned above for short- and medium-term instability) can be used to generate an indication that the measurements are unreliable due to long-term instability.

Clearly, as before, an operator can choose to ignore the indication, but would be well advised not to do so, especially if it were accompanied by similar indications in respect of short-term and/or long-term instability.

If the methods described herein are implemented by means of software, as is preferred, various procedures and routines can be implemented in response to any individual, any combination of, or all of the instability indications provided in accordance with the invention. In particular, but without limitation, the software may be configured to recommend certain courses of action to the operator in dependence, inter alia, upon the percentage values indicative of stability, evaluated as described above. It is preferred that all individual measurements taken, as well as all combinational and derivative results and values, be logged for future analysis.

It will be appreciated that all three of the instability indications described herein need not always be generated and/or used and the invention encompasses the generation and/or use of one only, or any combination of two, of the indications described herein. There is no current indication of reliability available in the field of the invention which is predicated solely upon the use of measurements taken with a single flowmeter. Proposals have been made to monitor the output of a second flowmeter nearby, and to use this as a master measurement to compensate for changes occurring whilst the profile measurements are taken, but this is frequently not feasible, either through accessibility problems or lack of a suitable flowmeter to use for the master measurement, and in any event, hydraulic delay will often render the technique unusable.

Each feature disclosed in this specification (which term includes the claims) and/or shown in the drawings may be incorporated in the invention independently of other disclosed and/or illustrated features.

What is claimed is:

1. A method of measuring fluid flow through a pipe comprising the steps of:
   (a) obtaining a plurality of measurements indicative of the flow velocity at each of a number of locations distributed over a cross-section of the pipe:
   (b) deriving from at least a first subset of the measurements an evaluation of flow velocity distribution over the cross-section of the pipe;
   (c) deriving from the change over time of at least a second subset of the measurements, an estimate of the stability of the measured flow velocity, and (d) providing an indication, based upon said estimate of stability, of the reliability of said flow velocity distribution.

2. A method according to claim 1, wherein the first and second subsets overlap.

3. A method according to claim 1, wherein said step (b) of deriving an evaluation of flow velocity comprises averaging some at least of the plurality of measurements.

4. A method according to claim 1 wherein said measuring device comprises an electromagnetic insertion probe.

5. A method according to claim 1 wherein said step of deriving an indication of the stability of the measured flow velocity comprises for each location the steps of:
(i) selecting the maximum and minimum measurements taken at that location during the period,
(ii) subtracting the minimum measurement from the maximum measurement to generate a difference value,
(iii) deriving an average of all the measurements taken at that location during the period, and
(iv) dividing the difference value by the average so derived to generate a short-term stability value indicative of the short-term stability of said measured flow velocity.

6. A method according to claim 5 including the further steps of comparing said short-term stability value, or a value derived therefrom, with a predetermined threshold value indicative of the limit of acceptable short-term stability in said measured flow velocity, and providing at least a contribution to said indication if said value, or derived value, exceeds said threshold.

7. A method according to claim 1, including for each location the further steps of:
(f) summing separately the first N and last N measurements made at that location during the period to generate initial sum and final sum measurements respectively,
(g) subtracting the final sum measurement from the initial sum measurement,
(h) dividing the result of the subtraction in step (g) by the initial sum to generate a medium-term stability value indicative of the medium-term stability of the measured flow velocity.

8. A method according to claim 7 wherein the value of N is five.

9. A method according to claim 8 including the further steps of comparing said medium-term stability value, or a value derived therefrom, with a predetermined threshold value indicative of the limit of acceptable medium-term stability in said measured flow velocity and providing at least a contribution to said indication if said medium-term stability value, or said value derived therefrom, exceeds said threshold.

10. A method according to claim 1 including the further steps of taking, after the conclusion of said taking of a plurality of measurements at each of a number of locations, repeat measurements at a plurality of selected said locations, comparing the repeat measurements with the original measurements at each of said selected locations, and deriving therefrom a long-term stability value indicative of the long-term stability of said measured flow velocity.

11. A method according to claim 10 including the further steps of comparing said long-term stability value, or a value derivative therefrom, with a predetermined threshold value indicative of the limit of acceptable long-term stability in said measured flow velocity, and providing at least a contribution to said indication if said value, or value derived therefrom, exceeds said threshold.

12. A method according to claim 1 wherein said indication comprises a warning.

13. A method according to claim 1 wherein said indication comprises an instruction.

14. A method according to claim 2, wherein said both of said first and second subsets contain a majority of said plurality of measurements.

15. A method of measuring fluid flow through a pipe including the steps of:
(a) using a measuring device to take, over a period of known duration, a plurality of measurements indicative of the flow velocity at each of a number of locations distributed over a cross-section of the pipe,
(b) averaging some at least of said plurality of measurements to provide averaged measurements,
(c) utilising the averaged measurements to derive an evaluation of the distribution of flow velocity over the cross-section of the pipe,
(d) deriving from at least some of said measurements of flow velocity an indication of the stability of the measured flow velocity, and
(e) providing an indication, based upon said indication of stability, of the reliability of said evaluation.

16. A method according to claim 15 wherein said measuring device comprises an electromagnetic insertion probe.

17. A method according to claim 15 wherein said step of deriving an indication of the stability of the measured flow velocity comprises for each location the steps of:
(i) selecting the maximum and minimum measurements taken at the location during the period,
(ii) subtracting the minimum measurement from the maximum measurement to generate a difference value,
(iii) deriving an average of all the measurements taken at that location during the period, and
(iv) dividing the difference value by the average so derived to generate a short-term stability value indicative of the short-term stability of said measured flow velocity.

18. A method according to claim 17 including the further steps of comparing said short-term stability value, or a value derived therefrom, with a predetermined threshold value indicative of the limit of acceptable short-term stability in said measured flow velocity, and providing at least a contribution to said value, or derived value, exceeds said threshold.

19. A method according to claim 15, including for each location the further steps of:
(f) summing separately the first N and last N measurements made at that location during the period to generate initial sum and final sum measurements respectively,
(g) subtracting the final sum measurement from the initial sum measurement,
(h) dividing the result of the subtraction in step (g) by the initial sum to generate a medium-term stability value indicative of the medium-term stability of the measured flow velocity.

20. A method according to claim 19 wherein the value of N is five.

21. A method according to claim 19 including the further steps of comparing said medium-term stability value, or a value derived therefrom with a predetermined threshold value indicative of the limit of acceptable medium-term stability in said measured flow velocity and providing at least a contribution to said indication if said medium-term stability value, or said value derived therefrom, exceeds said threshold.

22. A method according to claim 15 including the further steps of taking, after the conclusion of said taking of a plurality of measurements at each of a number of locations, repeat measurements at a plurality of selected said locations, comparing the repeat measurements with the original measurements at each of said selected locations, and deriving therefrom a long-term stability value indicative of the long-term stability of said measured flow velocity.

23. A method according to claim 22 including the further steps of comparing said long-term stability value, or a value derivative therefrom, with a predetermined threshold value indicative of the limit of acceptable long-term stability in said measured flow velocity, and providing at least a contribution to said indication if said value, or value derived therefrom, exceeds said threshold.

24. A method according to claim 15 wherein said indication comprises a warning.

25. A method according to claim 15 wherein said indication comprises an instruction.

26. Apparatus for measuring fluid flow through a pipe comprising:
- (a) first means for obtaining a plurality of measurements indicative of the flow velocity at each of a number of locations distributed over a cross-section of the pipe;
- (b) second means connected to said first means and arranged to derive from at least a first subset of the measurements an evaluation of flow velocity distribution over the cross-section of the pipe;
- (c) third means connected to said first means and arranged to derive from the change over time of at least a second subset of the measurements, an estimate of the stability of the measured flow velocity; and
- (d) fourth means, connected to said third means, for providing an indication, based upon said estimate of stability, of the reliability of said flow velocity distribution.

* * * * *